(12) United States Patent
Benson

(10) Patent No.: US 7,597,526 B2
(45) Date of Patent: Oct. 6, 2009

(54) ATTACHMENT DEVICE FOR FRONT-END LOADER

(75) Inventor: John Benson, Cottage Grove, MN (US)

(73) Assignee: Benson Metals, Inc., Mendota, MN (US)

( * ) Notice: Subject to any disclaimer, the term of this patent is extended or adjusted under 35 U.S.C. 154(b) by 507 days.

(21) Appl. No.: 11/222,559

(22) Filed: Sep. 8, 2005

(65) Prior Publication Data

US 2007/0065265 A1 Mar. 22, 2007

(51) Int. Cl.
*B66F 9/18* (2006.01)
(52) U.S. Cl. .................... 414/607; 414/420; 414/622
(58) Field of Classification Search ................ 414/607, 414/420, 622; 298/17 R, 17 T; 294/104
See application file for complete search history.

(56) References Cited

U.S. PATENT DOCUMENTS

| | | | | |
|---|---|---|---|---|
| 2,566,863 | A | * | 9/1951 | Voigt .................... 414/622 |
| 2,587,769 | A | * | 3/1952 | Rowe .................... 414/733 |
| 3,486,648 | A | | 12/1969 | Wald |
| 3,595,414 | A | | 7/1971 | Brown et al. |
| 3,613,924 | A | | 10/1971 | Monson |
| 4,036,383 | A | | 7/1977 | Allen |
| 4,720,232 | A | * | 1/1988 | Williams ................ 414/607 |
| 4,838,752 | A | | 6/1989 | Bryant |
| 5,374,027 | A | * | 12/1994 | Tsai .................... 414/607 |
| 5,496,147 | A | * | 3/1996 | Taube .................... 414/607 |

OTHER PUBLICATIONS

Merriam-Webster online definition of "into".*
EML Produkter AB Container Dumper; EML LV 500 and EML LV 1000 Marketing Catalog, 4 pages.
Toppy America, The turning point for your business, 2 page print-out (prior art as of Sep. 8, 2005).
Vestil Manufacturing Company, Self Dumping Steel Hoppers, 1 page print-out (prior art as of Sep. 8, 2005).
Econo Lift, Ergonomic Products, Minnesota Supply Company, Product Catalogue 52 total pages (Sep. 2006).
Hercules/The Workhorse of Material Handling; Burton Equipment, Product Catalogue 32 total pages (prior art as of Sep. 8, 2005).
Valley Craft, EZY-DUMP/Controlled Hydraulic Multiple Hopper System for Lift Trucks, 4 page brochure (1985) (handwritten markings are not prior art).
Cascade Corporation, various pages from product price list, 26 total pages (Jan. 2003).
EML Produktor AB Container Dumper related to literature previously cited, 5 photographs (prior art as of Sep. 8, 2005).
Benson Metals, Inc., BBD-6000 Benson Bin Dumper, 4 page brochure.

* cited by examiner

*Primary Examiner*—Michael S Lowe
(74) *Attorney, Agent, or Firm*—Merchant & Gould P.C.

(57) ABSTRACT

The container handling device may include features useful for supporting a container (e.g., an open top rectangular bin) while the container is being filled, and supporting the container when tipping the container to empty contents of the container. The container handling device includes features that improve safe handling of the container when emptying. The container handling device also includes features that provide improved assembly and disassembly of various features for the purposes of, for example, manufacturing, shipping, replacing parts, and conducting maintenance.

29 Claims, 8 Drawing Sheets

ATTACHMENT DEVICE FOR FRONT-END LOADER

BACKGROUND

1. Technical Field

The present invention generally relates to container handling devices, and more specifically relates to container handling devices for front-end loaders.

2. Related Art

Front-end loaders are commonly used to transport containers. Containers often need to be emptied while carried by the front-end loader. Attachment devices for front-end loaders are a convenient manner of emptying a container while the container is still carried by the front-end loader. There have been substantial efforts directed at improving various aspects of such attachment devices.

It is often advantageous to empty large, open-topped containers by tipping the container using the attachment device to let the contents fall out. While this is an effective means of emptying the container, this type of emptying may result in problems arising from operator error, non-uniform size containers, or erratic handling of the container if the container is not properly handled by the attachment device. If the container is not properly handled, operators in close proximity to the front-end loader are endangered and there is a potential for damage to surrounding equipment and the contents of the container if the container falls off the attachment device. The likelihood of a container falling off an attachment device is increased if the handling operation of the attachment device is not smooth and consistent.

Furthermore, the need for an attachment device to be capable of handling different sized containers necessitates the attachment device contain a number of components, many of which are sizable. Some attachment devices integrate components with permanent connections, such as welding, that can result in disadvantages related to manufacturing, transport, and maintenance of the attachment device. For example, a permanently integrated attachment device must be painted or finished as a single unit, which requires a large facility. Transporting a permanently integrated attachment device provides similar challenges since large structures are unwieldy to handle and require a vehicle with a large cargo capacity. Even after manufacturing and transporting a permanently integrated attachment device, maintaining the attachment device can be difficult because replacing a component will either require a difficult process or necessitate acquiring an entirely new attachment device.

SUMMARY

The present invention generally relates to container handling devices, and more specifically relates to container handling devices for front-end loaders. The container handling device may include features useful for supporting a container (e.g., an open top rectangular bin) while the container is being filled, and supporting the container when tipping the container to empty contents of the container. The container handling device includes features that improve safe handling of the container when emptying. The container handling device also includes features that provide improved assembly and disassembly of various features for the purposes of, for example, manufacturing, shipping, replacing parts, and conducting maintenance.

One aspect of the invention relates to a container holding device for use with a front-end loader, wherein the device includes a base, a container frame, first and second actuators, and first and second bottom container retainers. The base frame includes first and second rails, a cross-support coupled between the first ends of the first and second rails. The base frame is configured for attachment to the front-end loader. The container frame includes first and second horizontal arms, first and second vertical arms, and first and second top container retainers. The top container retainers extend from the vertical arms in a direction generally parallel to the horizontal arms. The horizontal arms are pivotally coupled to the base frame at second ends of the first and second rails with first and second coupling members. The coupling members are adjustable to provide detachment of the container frame from the base frame, and the top bin retainers extend from ends of the vertical arms in a direction parallel to the horizontal arms. The first actuator is coupled between the base frame and the container frame and is configured to move the container frame relative to the base frame a first distance. The second actuator is coupled between the base frame and the container frame and is configured to move the container frame relative to the base frame a second distance. The first and second bottom container retainers are adjustable between extended and retracted position, wherein in the extended position the container retainers restrict horizontal movement of a container supported on the first and second rails.

Another aspect of the invention relates to a container holding device for use with a front-end loader, wherein the device includes a base frame, a container frame, first and second actuators, and a bottom container retainer. The base frame includes first and second rails, a cross-support coupled between the first ends of the first and second rails, and an actuator support extending in a generally normal direction from cross-support. The base frame is configured for attachment to the front-end loader. The container frame includes first and second horizontal arms, first and second vertical arms extending from the horizontal arms, a top container retainer, and an actuator engagement member. The actuator engagement member includes a track structure and the horizontal arms is pivotally coupled to the base frame at second ends of the first and second rails with first and second coupling members. The top container retainer extends from one of the vertical arms in a direction parallel to the horizontal arms and is arranged to resist movement of a container supported on the horizontal arms in a direction perpendicular to the horizontal arms. The first actuator is coupled to and extends parallel with the actuator support. The first actuator includes a roller positioned on a free end thereof that is configured to fit within the track structure, wherein extension of the first actuator moves the container frame through pivotal motion relative to the base frame. The second actuator is coupled between the base frame and the container frame and configured to move the container frame through further pivotal motion relative to the base frame. The bottom container retainer includes an elongate actuating arm and an engagement arm coupled to the actuating arm. The actuating arm is mounted to the container frame and configured to rotatably adjust the engagement arm into an engagement position to resist movement of the container relative to the horizontal arms in a direction parallel to the horizontal arms.

A further aspect of the invention relates to a method of unloading a container using a container holding device that is attached to a front-end loader. The holding device includes a base frame, a container frame, first and second actuators, at least one bottom container retainer, and at least one top container retainer. The base frame includes first and second rails and is configured for attachment to the front-end loader. The container frame includes first and second horizontal arms and at least one vertical arm. The method includes supporting the container on the first and second horizontal rails, rotating the bottom container retainer into a raised position to engage a bottom front edge of the container, and coupling the at least one top container retainer to the at least one vertical arm and adjusting a position of the at least one top container retainer to engage a top rear edge of the container. The method further includes coupling the first and second horizontal arms to respective first and second rails with a pivot connection, the pivot connection being removable to provide detachment of the horizontal arms from the rails, actuating the first actuator to initiate rotation of the container frame relative to the base frame, and actuating the second actuator after actuating the first actuator to further rotate the container frame relative to the base frame until contents of the container unload from the container by gravity forces.

The above summary of the present invention is not intended to describe each disclosed embodiment or every implementation of the present invention. The detailed description that follow more particularly exemplified embodiments of the invention. While certain embodiments will be illustrated and described, the invention is not limited to use in such embodiments.

BRIEF DESCRIPTION OF THE DRAWINGS

The invention may be more completely understood in consideration of the following detailed description of various embodiments in the invention and in connection with accompanying drawings, in which.

Figure 1:
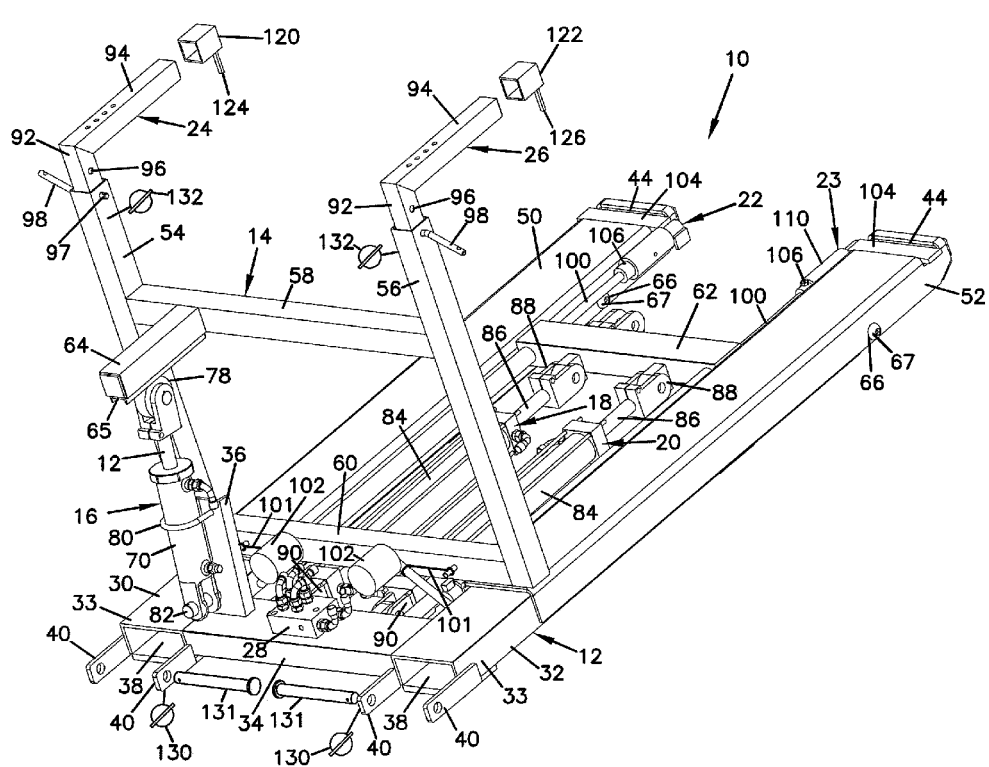
FIG. 1 is a top rear perspective view of an example attachment device according to the invention, wherein the device is in a lowered position.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present invention relates to attachment devices for handling containers. The attachment devices are particularly useful for carrying containers using a front-end loader. The attachment devices include a first frame member that is mounted to the horizontal arms of a front-end loader, and a second frame member that can rotate with respect to the first frame member. As will be described below, the attachment devices further include mechanisms for rotating the second frame member relative to the first frame member, and mechanisms for securing the container to the attachment device before, during, and after rotation of the second frame member relative to the first frame member. The following detailed description, with reference to FIGS. 1-8, describes example container handling devices for a front-end loader.

Figure 2:
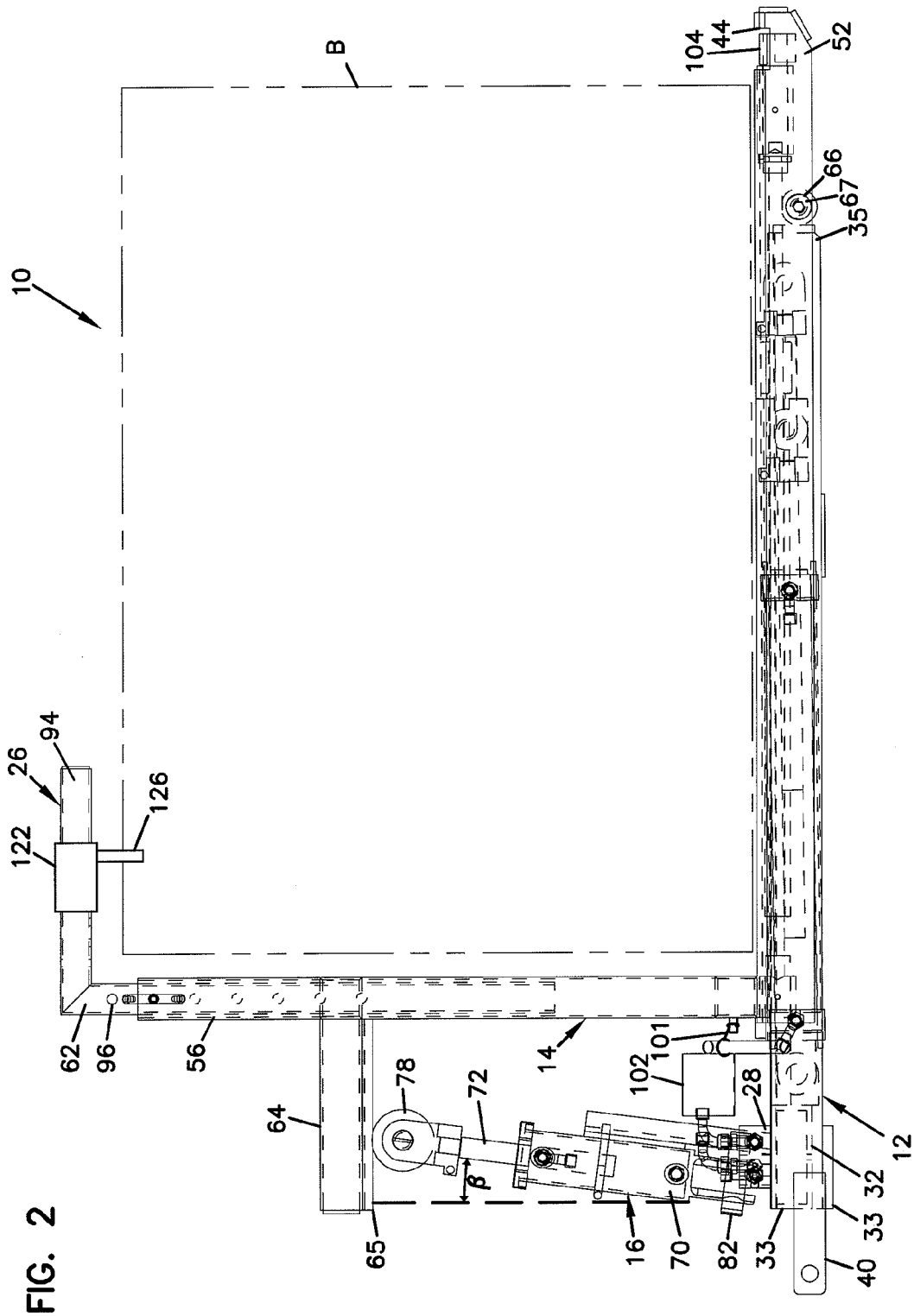
FIG. 2 is a side view of the attachment device shown in FIG. 1.
Figure 3:
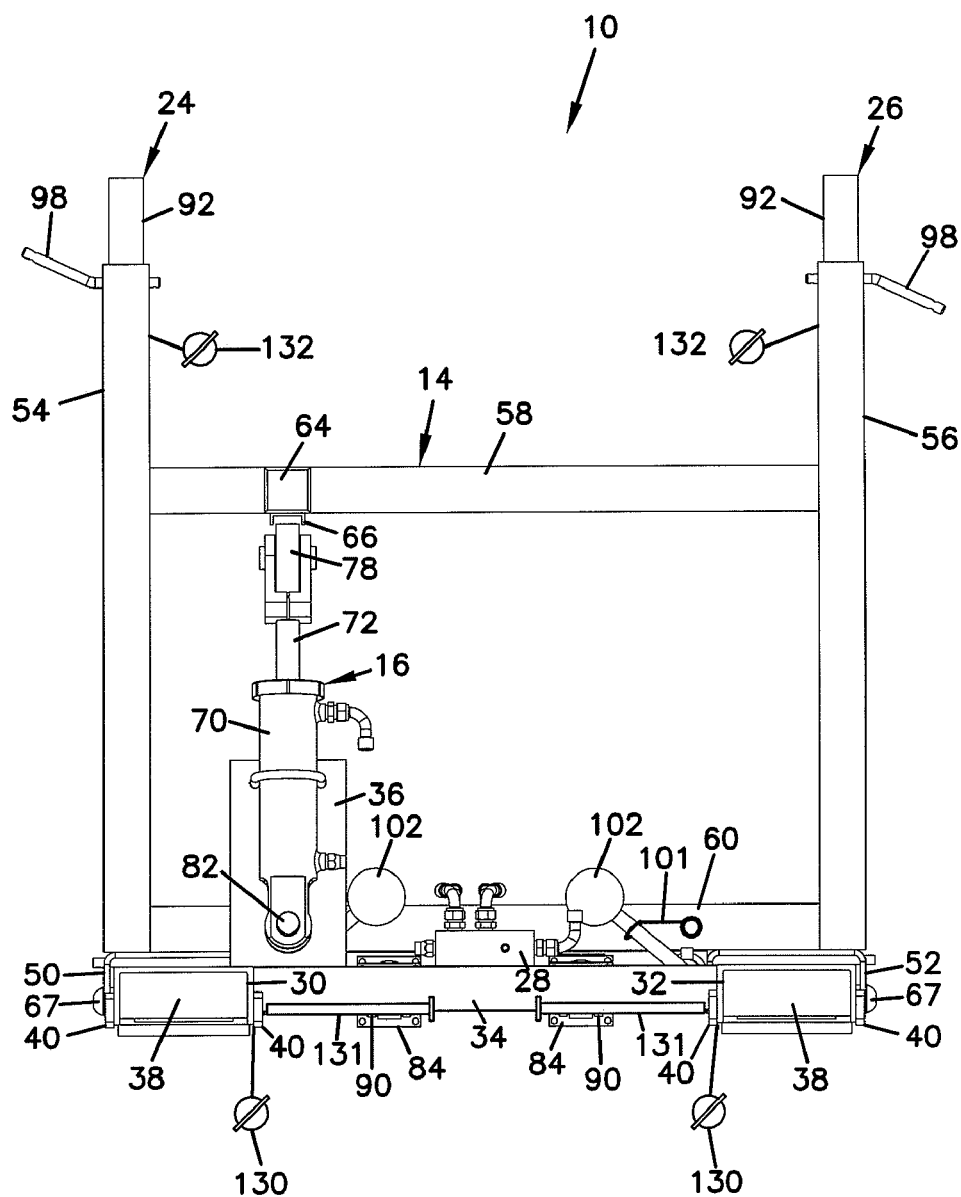
FIG. 3 is a rear view of the attachment device shown in FIG. 1.
Figure 4:
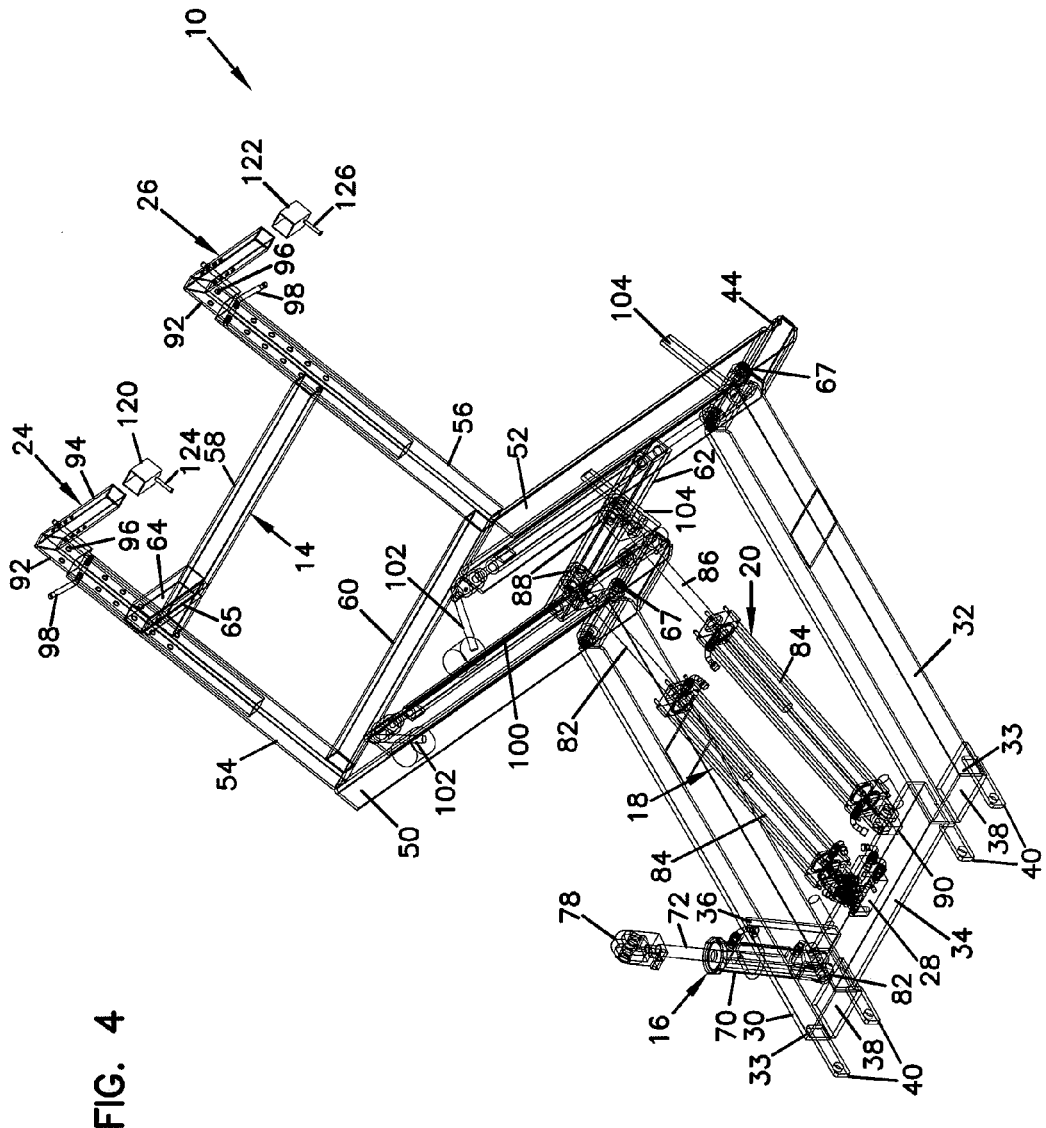
FIG. 4 is a top rear perspective view of the attachment device shown in FIG. 1, wherein the device is in a raised position.
Figure 5:
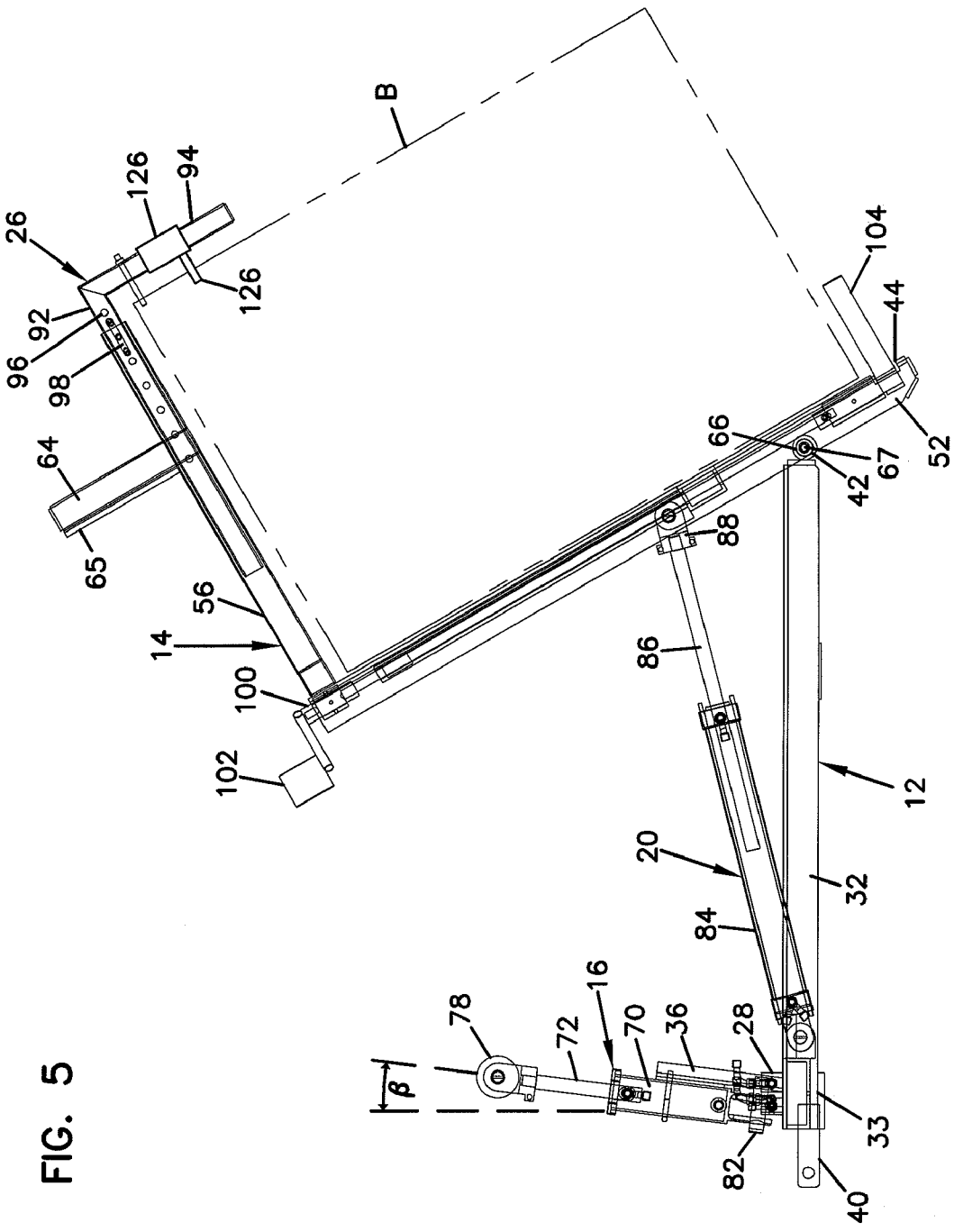
FIG. 5 is a side view of the attachment device shown in FIG. 4.

FIGS. 1-3 illustrate a container handling device 10 in a closed, non-rotated position. FIGS. 4 and 5 illustrate the device 10 in an open, rotated position. Container handling device 10 includes a base frame 12, which is configured to engage the lift arms of a front-end loader that extend generally horizontally from the front side of the front-end loader (e.g., see lift arms 202 of loader 200 shown in FIG. 8). A container frame 14 is connected to base frame 12 and can rotate with respect to base frame 12. The device 10 can hold and support a container such as, for example, box B shown in FIGS. 2 and 5.

A first actuator 16 is shown connected to base frame 12 in a retracted state. The first actuator 16 is positioned between the base frame 12 and the container frame 14 so that extension of the first actuator 16 initiates rotation of the container frame 14 with respect to the base frame 12. The first actuator 16 may be, for example, a mechanical actuator, hydraulic actuator, pneumatic actuator, or of any other type of actuator capable of supplying sufficient force to initiate rotation of container frame 14 with respect to base frame 12. The first actuator 16 is arranged at an angle β relative to a plane that is arranged perpendicular to the base frame 12. The angle beta is typically in the range of about 5° to about 15°.

A second actuator 18 and a third actuator 20 are shown positioned between the base frame 12 and the container frame 14 in a retracted state. The second and third actuators 18, 20 can be extended to further rotate the container frame 14 with respect to the base frame 12. The second and third actuators 18, 20 may be, for example, mechanical actuators, electric actuators, hydraulic actuators, pneumatic actuators, or of any other type of actuators capable of supplying sufficient force to rotate container frame 14 with respect to base frame 12.

A first bottom container retainer 22 and a second bottom container retainer 23 are connected to container frame 14. A container is generally supported on the container frame 14. As the container frame 14 rotates with respect to the base frame 12, a container generally supported by the container frame 14 is motivated by gravity to slide off of the container frame 14. The first and second bottom container retainers 22, 23 help prevent a container from sliding off the container frame 14 as the container frame 14 rotates with respect to the base frame 12.

A first top container retainer 24 is connected to the container frame 14. A first insert container retainer 120 is connected to the first top container retainer 24 and includes a retaining peg 124 that extends substantially perpendicular to the first top container retainer 24. A second top container retainer 26 is connected to the container frame 14. A second insert container retainer 122 is connected to the second top container retainer 26 and includes a retaining peg 126 that extends substantially perpendicular to the second top container retainer 26.

A container is generally supported by the container frame 14. As the container frame 14 rotates with respect to the base frame 12, the first and second bottom container retainers 22, 23 help prevent a container from sliding off of the container frame 14. As the container frame 14 continues to rotate with respect to the base frame 12, a container will be motivated by gravity to tip off the container frame 14. The first and second top container retainers 24, 26 help prevent a container from tipping off of the container frame 14 as the container frame 14 rotates with respect to the base frame 12.

Container handling device 10 is capable of handling open-top containers. The retaining pegs 124, 126 of the first and second insert container retainers, 120, 122 can extend into the open top of an open-top container to help prevent a container from both sliding and tipping off of the container frame 14 as the container frame 14 rotates with respect to the base frame 12.

An actuator controller 28 is attached to the base frame 12. The actuator controller 28 is capable of controlling the first actuator 16, the second actuator 18, the third actuator 20, or any combination thereof. More than one actuator controller 28 may be used to control the actuators 16, 18, 20, 22, separately or in any combination thereof. The actuator controller 28 may be of any type such as, for example, a hydraulic controller, a pneumatic controller, or an electronic controller.

The base frame 12 includes a first rail 30, a second rail 32, first and second ends 33, 35, a cross-support 34, and an actuator support 36. The first and second rails 30, 32 are substantially parallel to each other and spaced apart to allow the base frame 12 to be engaged by the lifting arms of a front-end loader (e.g., see lift arms 202 of loader 200 shown in FIG. 8). The arms of the front-end loader engage the rails 30, 32 via fork channels 38 defined at the first end 33 of each of the rails 30, 32.

The cross-support 34 connects the first rail 30 and the second rail 32 near the first end 33. The actuator support 36 is connected to the base frame 12 and supports the first actuator 16. The actuator support 36 extends from the base frame 12 at an angle of about 75° to about 90°.

A fork attachment bracket 40 is attached to the base frame 12 near the first end 33. Fork attachment 40 is substantially parallel to the first and second rails 30, 32 and extends past the first end 33. Fork attachment bracket 40 provides a structure for anchoring container handling device 10 to a front-end loader to help prevent container handling device 10 from sliding of the lift arms of the front-end loader. A pair of anchoring bolts 131 may be used to secure the brackets 40 to the front-end loader. Securing pins 130 may be secured to the bolts 131 after they have been inserted into the brackets 40 to help retain the bolts 131 in place.

The first and second rails 30, 32 have a base frame aperture 42 near the second end 35. The aperture 42 may be defined in the rails 30, 32 (e.g., through sidewalls of the rails—not shown), or defined by a cylindrical sleeve 43 mounted to the rails 30, 32 using, for example, a mounting plate 45 (see the exploded view shown in FIG. 7). Additional sleeve sections (e.g., sleeve 51) may be used depending on the size and type of connector used to couple the rails 30, 32 to the container frame 14. Typically, the base frame aperture 42 coincides with a axis about which the container frame 14 rotates with respect to the base frame 12. The pivotal connection of the rails 30, 32 to the container frame 14 via the frame apertures 42 is discussed below.

Each rails 30, 32 includes an engagement arm recess 44 formed in a top primary surface thereof near the second end 35. The recess 44 is sized to retain engagement arms of the first and second bottom container retainers 22, 23 in a retracted position that is flush mounted with the top primary surface of the rails 30, 32. A similar recess 44 may be formed in container frame 14 alone or in or both the base and container frames 12, 14.

The container frame 14 includes a first and second horizontal arms 50, 52, a first and second vertical arms 54, 56, a first, second and third container frame cross-supports 58, 60, 62, and an actuator engagement member 64. The first and second horizontal arms 50, 52 are substantially parallel to each other and configured to engage the top primary surface of the first and second rails 30, 32, respectively. The arms 50, 52 also define a top primary surface upon which a container retained by the container handling device 10 is supported.

The first and second vertical arms 54, 56 are extend vertically in a perpendicular direction from the first and second horizontal arms 50, 52, respectively. The first and second verticals arms 54, 56 also extend substantially parallel to each other and are configured to mount the first and second top container retainers 24, 26 in a position across a top of a container held by the container handling device 10.

The first container frame cross-support 58 extends horizontally between the first and second vertical arms 54, 56. The first container frame cross-support 58 is positioned at a distance spaced vertically from base frame cross-support 34 (e.g., a spaced distance slightly greater than the retracted length of first actuator 16). The second container frame cross-support 60 extends horizontally between the first and second vertical arms 54, 56 near the attachment point of first and second vertical arms 54, 56 with the respective first and second horizontal arms 50, 52. The third container frame cross-support 62 extends horizontally between the first and second horizontal arms 50, 52. The third container frame cross-support 62 is positioned at a distance spaced horizontally from the base frame cross-support 34 (e.g., a distance slightly greater than the retracted length of second and third actuators 18, 20).

The actuator engagement member 64 extends horizontally from the first container frame cross-support 58 in a direction towards the first actuator 16. The actuator engagement member 64 extends into a position generally vertically above the first actuator 16 and is in a path of extension of the first actuator 16. The engagement member 64 includes a track 65 attached to a bottom side thereof for engagement with the first actuator 16 when the first actuator 16 extends. The track 65 helps the first actuator 16 maintain contact with the engagement member 64 as the first actuator 16 extends, thereby rotating the container frame 14 relative to the base frame 12.

Figure 7:
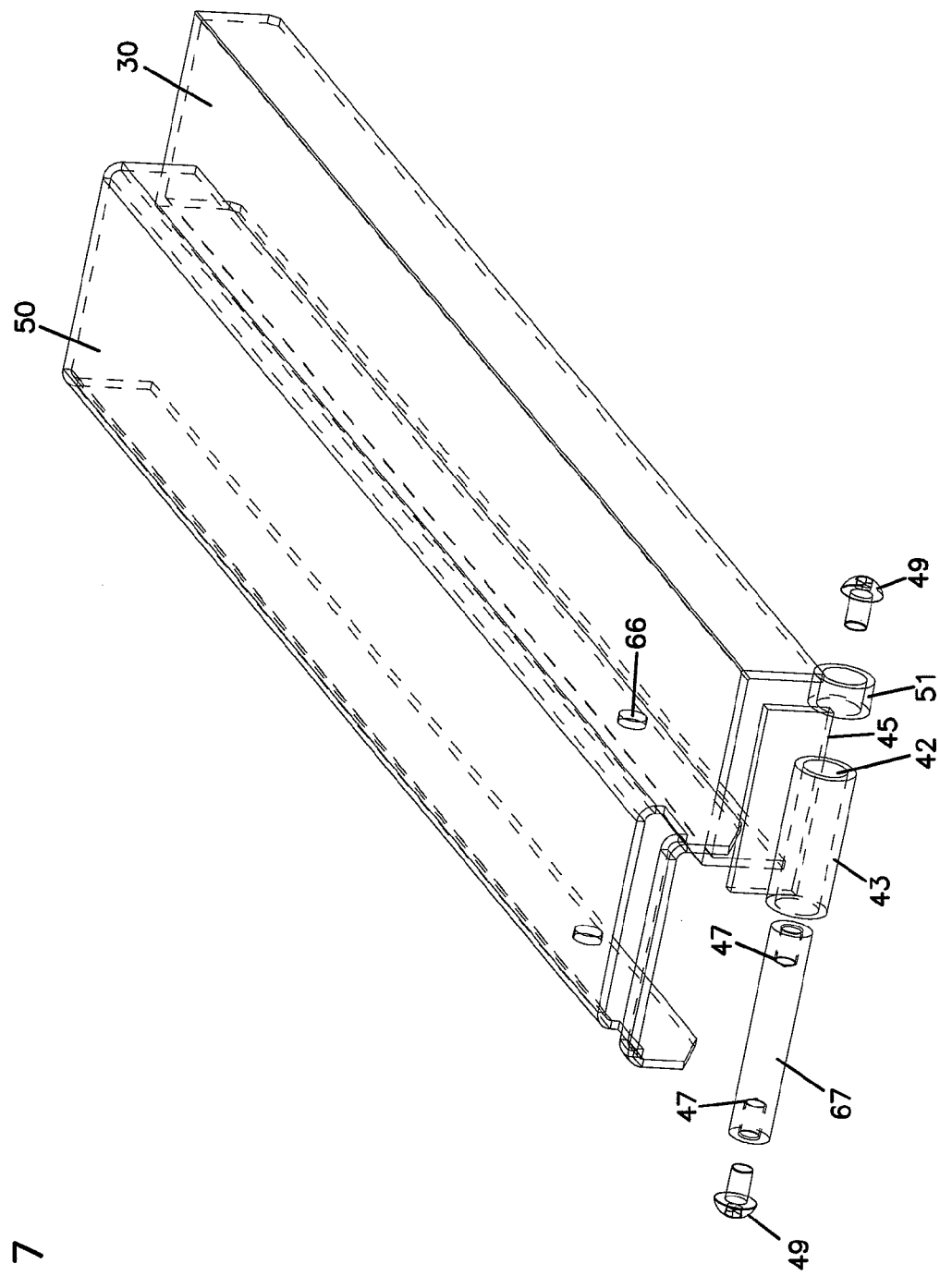
FIG. 7 is an exploded perspective view of portions of the container frame and base frame shown in FIGS. 1-5 and the pivotal attachment of those frame members to each other.

The first and second horizontal arms 50, 52 each include a container frame aperture 66 positioned, for example, between opposing ends of the arms 50, 52. The container frame aperture 66 is arranged coaxially with the base frame aperture 42. The apertures 42, 66 are sized to receive a coupling member 67. The coupling member 67 may be, for example, a pin, bolt, rod, or any hardware sufficient to couple the apertures 42, 66 together to allow the container frame 14 to rotate with respect to the base frame 12. FIG. 7 illustrates member 67 as a pin having recesses 47 formed in opposing ends. The recesses 47 are sized to receive caps 49 that provide a more secure attachment and retention of the member 67 within the aperture 42 defined by sleeve 43.

In some embodiments, the member 67 may have other configurations that provide desired pivotal connection between the bases 12, 14. For example, the member 67 may include a bolt configuration with a fixed head on one end and external threads on an opposing end that is configured to receive a removable nut.

The coupling member 67 is preferably configured for relatively easy removal from the apertures 42, 66 to provide disassembly of the frames 14, 16 from each other. For example, by removing one or more of the caps 49, the member 67 can be removed so that the base frame 12 and container frame 14 are separable. Easy disassembly may also provide advantages related to replacement and maintenance of the member 67 or other features associated with the pivotal connection between the bases 12, 14.

The first actuator 16 includes a first actuator fixed component 70 and a first actuator extending component 72. The first actuator fixed component 70 is connected to the actuator support 36. The first actuator extending component 72 includes a roller 78 mounted on one end that engages the track 65. The first actuator extending component 72 can extend from the first actuator fixed component 70 to initiate rotation of the container frame 14 with respect to the base frame 12. The roller 78 rolls along the track 65 as the first actuator 16 extends, causing the container frame 14 to begin rotating relative to the base frame 12. The use of the roller 78 as a contact surface between the first actuator 16 and the container frame 14 provides a reduced friction contact and a smoother actuation of the container frame 14 through its rotation motion relative to the base frame 12. The track 65 and the roller 78 help to ensure that the initial rotation of the container frame 14 with respect to the base frame 12 is controlled and consistent.

The first actuator 16 is secured to the actuator support 36 by a bracket 80 and an actuator coupler 82. The actuator coupler 82 may be, for example, a pin, bolt, rod, or any hardware sufficient to connect the first actuator 16 to the actuator support 36. The actuator coupler 82 is preferably removable to allow the first actuator 16 to be easily separated from the actuator support 36, for example, when the first actuator 16 must be repaired or replaced.

A container frame bracket 88 may be used to connect the second and third actuators 18, 20 to the third container frame cross-support 62. The container frame bracket 88 may be any hardware configured for attachment of the first and second actuators 18, 20 to the cross-support 62 while permitting rotational movement of the actuators 18, 20 relative to the cross-support 62. A removable pin may be used to couple the actuators 18, 20 to the cross-support 62 thereby providing easy detachment of the actuators 18, 20 for maintenance or replacement purposes.

A base frame bracket 90 may be used to connect the second and third actuators 18, 20 to the base frame cross-support 34. The base frame bracket 90 may be any hardware configured for attachment of the first and second actuators 18, 20 to the cross-support 34 while permitting rotational movement of the actuators 18, 20 relative to the cross-support 34. A removable pin may be used to couple the actuators 18, 20 to the cross-support 34 thereby providing easy detachment of the actuators 18, 20 for maintenance or replacement purposes.

The first and second top container retainers 24, 26 each include an insert leg 92 and an engagement leg 94. The insert leg 92 of the first container retainer 24 is parallel with and engages the first vertical arm 54. The insert leg 92 of the second container retainer 26 is parallel with and engages the second vertical arm 56. The engagement leg 94 is substantially perpendicular to the insert leg 92 and substantially parallel with the first and second horizontal arms 50, 52.

The insert leg 92 has at least one insert leg adjustment aperture 96. The insert leg 92 may have any number of insert leg adjustment apertures 96 to provide the desired amount of adjustment of the top container retainers 24, 26 relative to the vertical arms 54, 56. The first and second vertical arms 54, 56 each include a vertical arm adjustment aperture 97. An adjustment coupler 98 may be inserted through the insert leg adjustment aperture 96 to the vertical arm adjustment aperture 97 to provide a connection and engagement between the container retainers 24, 26 and the container frame 14. A pin 132 may be used to retain the coupler 98 in the apertures 96, 97. The adjustment coupler 98 may be, for example, a pin, bolt, rod, or any hardware that is removable from the apertures 96, 97 and replaceable therein for a height adjustment of the container retainers 24, 26 relative to the container frame 14. The distance from the first and second horizontal arms 50, 52 to the engagement leg 94 can be adjusted by changing which insert leg adjustment aperture 96 that adjustment coupler 98 is engaged with.

Figure 6:
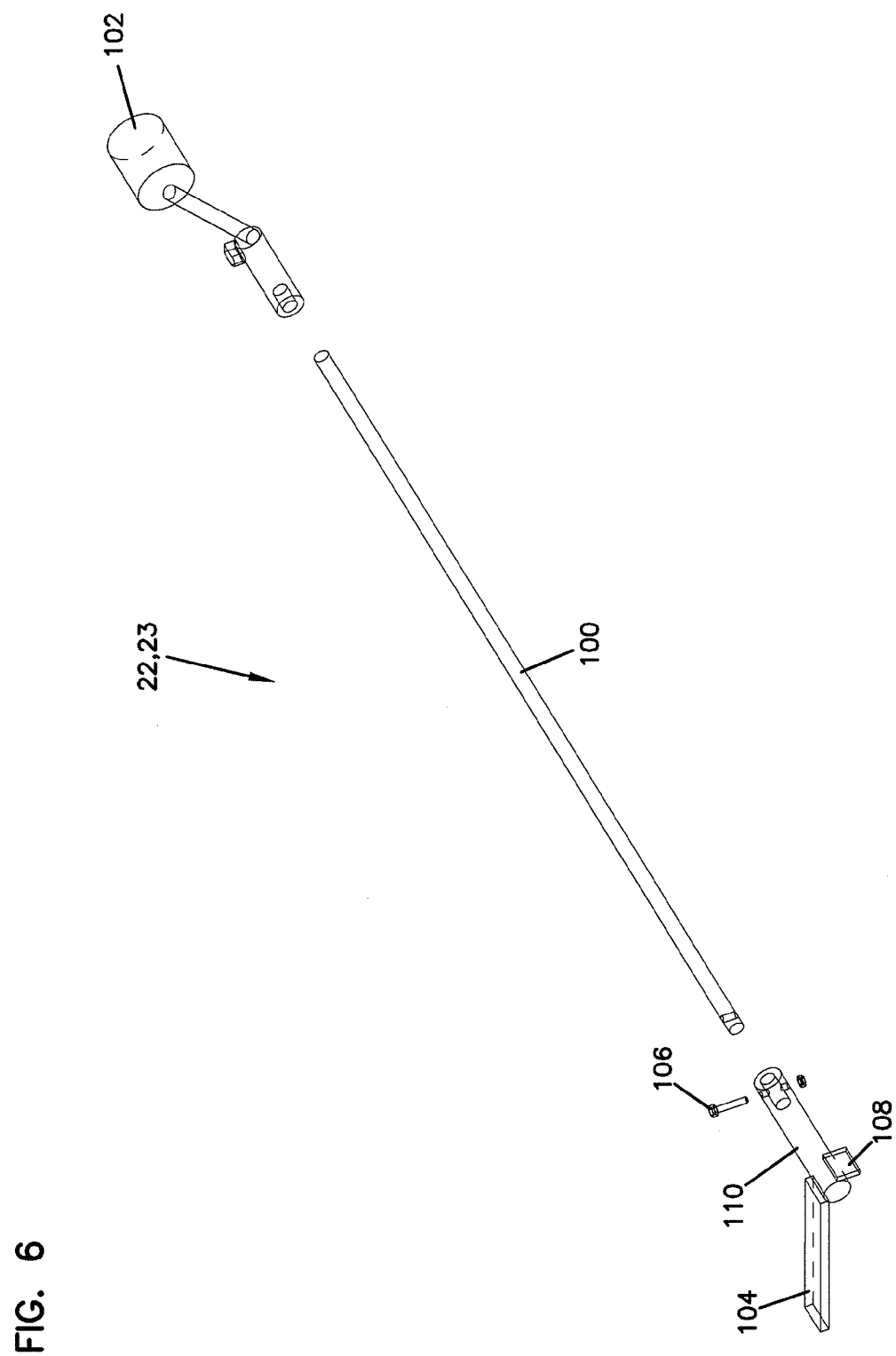
FIG. 6 is an exploded perspective view of one of the container retainers shown in FIGS. 1-5.

The first and second bottom container retainers 22, 23 each include an actuating arm 100, a spring retainer 101, a counterweight 102, a first engagement arm 104, a fastener 106, a first stop 108, and a first cylinder 110 (see FIG. 6 for an exploded view of an example bottom container retainer 22, 23). The actuating arm 100 is coupled to the container frame 14 in an orientation substantially parallel with the first horizontal arm 50 and can rotate about an axis substantially parallel to the first horizontal arm 50. The counterweight 102 is attached to an end of the actuating arm 100 adjacent to the first end 33 of the base frame 12. An opposing end of the actuating arm 100 as well as the first engagement arm 104 and the first stop 108 are attached to the first cylinder 110. In some embodiments, the first engagement arm 104, first stop 108, and first cylinder 110 may be integrally formed as a single piece using, for example, casting or molding techniques. In other embodiments, some or all of the first engagement arm 104, the first stop 108, and the first cylinder 110 may be separate pieces that are coupled together during assembly of the container handling device 10 using, for example, fasteners, welding, etc.

A fastener 106 (e.g., a removable pin) may be used to detachably connect the first cylinder 110 to the actuating arm 100. Bottom retainers 22, 23 may include additional fasteners or other structures that provide disassembly of various parts or subassemblies of the retainers 22, 23 for purposes of, for example, maintenance or replacement of parts. The ability to replace or repair individual portions of the bottom retainers 22, 23 separate from the entire assembly can provide cost and time efficiencies that may not be possible if the entire assembly 22, 23 has to be removed and/or replaced for every repair or maintenance required. For example, removing fastener 106 can provide removal and replacement of the arm 104 without disconnecting or removing the other parts 100, 102 from the frame 14.

The first bottom container retainer 22 maintains a closed position when first engagement arm 104 is positioned in the engagement recess 44. The counterweight 102 provides a rotational force on the actuating arm 100 that biases the first bottom container retainer 22 into the closed position when the container holding device 10 is in the closed position. The retainer spring 101 helps to bias the first engagement arm 104 into a raised position when the container holding device 10 is in the open position (see FIGS. 4-5). The biasing forces of spring 101 may be especially useful if the container B is not in contact with the 104 as the device 10 moves between the open and closed positions.

The retainer spring 101 may be a compression, extension or any other desired style of spring depending the position and orientation of the spring 101. The retainer spring 101 may be positioned at alternative locations besides adjacent to the counterweight 102. For example, the spring 101, or some other type of biasing member, may be positioned along the length of the actuating arm 100 and provide a rotational force on the arm 100.

The second bottom container retainer 23 includes an actuating arm 100, a counterweight 102, a first engagement arm 104, a fastener 106, a first stop 108, and a first cylinder 110. The actuating arm 100 is coupled to the container frame 14 in an orientation substantially parallel with the second horizontal leg 52 and can rotate about an axis substantially parallel to the second horizontal leg 52. The counterweight 102 is attached to an end of the actuating arm 100 adjacent to the first end 33 of the base frame 12. An opposing end of the actuating arm 100 as well as the first engagement arm 104 and the first stop 108 are attached to the first cylinder 110. In some embodiments, the first engagement arm 104, the first stop 108, and the first cylinder 110 may be integrally formed as a single piece using, for example, casting or molding techniques. In other embodiments, the first engagement arm 104, first stop 108, and first cylinder 110 may be separate pieces that are couple together during assembly of the container handling device 10 using, for example, fasteners, welding, etc. The fastener 106 is a removable pin that detachably connects the first cylinder 110 to the actuating arm 100.

The second bottom container retainer 23 maintains a closed position when first engagement arm 104 is positioned in the engagement recess 44. The counterweight 102 provides a rotational force on the actuating arm 100 that biases the second bottom container retainer 23 into the closed position when the container holding device 10 is in the closed position.

FIGS. 4 and 5 illustrate the container holding device 10 in a partially open position after initial rotation provided by extension of the first actuator 16. After initial rotation by the first actuator 16, the roller 78 no longer engages with track 65 and the second and third actuators 18, 20 control further rotation of the container frame 14 relative to the base frame 12.

The first bottom container retainer 22 rotates into an open position when the first engagement arm 104 is substantially perpendicular to first horizontal arm 50. As the container frame 14 rotates with respect to the base frame 12, the rotated position of the counterweight 102 changes thereby providing a different rotational force that biases the first engagement arm 104 into the open position shown in FIGS. 4 and 5. The second bottom container retainer 23 rotates into an open position when the first engagement arm 104 is substantially perpendicular to second horizontal arm 52. As the container frame 14 rotates with respect to the base frame 12, the rotated position of the counterweight 102 changes thereby providing a different rotational force that biases the first engagement arm 104 into the open position shown in FIGS. 4 and 5.

While the counterweights 102 function effectively to ensure that the engagement arms 104 are always raised with the frame 14 rotates open, other mechanisms and configurations may be used in place of the counterweights 102 and provide the same or similar result.

The container holding device 10 may include several safety measures that can improve the overall safety of the device 10. The first and second bottom container retainers 22, 23 help prevent a container from sliding off of the container frame 14 as the container frame 14 rotates relative to the base frame 12 by providing a physical stop along a bottom front edge of the container. Additionally, the retaining pegs 124, 126 of the first and second insert container retainers 120, 122 can extend into an open top container to help prevent a container from sliding off container frame 14 as container frame 14 rotates with respect to base frame 12 by providing a physical stop along a back top interior edge of the container. Furthermore, the first and second top container retainers 24, 26 help prevent a container from tipping off of the container frame 14 as the container frame 14 rotates relative to the base frame 12 by providing a physical stop along a top back edge of the container. The height of the first and second top container retainers 24, 26 is adjustable to help of secure a top rear edge of a container for containers of various sizes held by the container frame 14. Additionally, the retaining pegs 124, 126 of the first and second insert container retainer, 120, 122 extend into an open top container to help prevent a container from tipping off container frame 14 as container frame 14 rotates with respect to base frame 12 by providing a physical stop along a top back edge of the container.

Controlled and consistent handling of containers by device 10 also improves overall safety. The use of the track 65 and the roller 78 helps to ensure that the initial rotation of the container frame 14 with respect to the base frame 12 is controlled and consistent. During initial rotation, the roller 78 maintains contact with the track 65 as it rolls. The rolling action helps prevent the erratic movements that may be cause by surfaces sliding against one another.

The container holding device 10 may include additional first and second insert container retainers 120, 122 that are coupled to container retainers 24, 26, respectively (see FIGS. 1, 2, 4 and 5). The first and second insert container retainers 120, 122 include retaining pegs 124, 126 that extend in a direction toward the horizontal arms 50, 52 of the container frame 14. The first and second insert container retainers 120, 122 may be configured to fit into or fit over an exposed end of the container retainers 24, 26 and secured to the retainers 24, 26 with a connecting member such as, for example, a connecting pin (not shown).

In use, the first and second insert container retainers 120, 122 may be coupled to the retainers 24, 26 after the retainers 24, 26 have been adjusted into a desired position relative to the vertical arms 54, 56 of the frame 14 (e.g., the retainers 24, 26 have been adjusted vertically into contact with a top surface of a container held in frame 14). The first and second insert container retainers 120, 122 may alternatively be secured to the retainers 24, 26 before the retainers 24, 26 are connected or positioned relative to the vertical arms 54, 56.

By connecting the first and second insert container retainers 120, 122 to retainers 24, 26, the retaining pegs 124, 126 typically can extend into an interior of a container held by the frame 14. The arms can then provide additional safety for the device 10 by increasing its ability to retain a container when the container frame 14 rotates relative to the base frame 12 to empty the container.

Separability of components can simplify manufacturing, transportation, and maintenance of the container holding device 10 or sub-assemblies of the device 10. Separation and easy disassembly permits components to be constructed and finish (e.g., painted, etc.) as separate pieces, which simplifies manufacturing and assembly of the container handling device 10. Constructing an integrated device requires welding or similar operation that is more complex and expensive than using less permanent forms of assembly, such as fasteners. Also, constructing an integrated device using welding or similar operation is more difficult than using less permanent forms of assembly in the case of an error or desired modification. Finishing an integrated device is difficult for large devices since painting, chemically treating, or similar operation would require a facility at least as large as the device. Disassembling a device prior to finishing requires a smaller facility. Also, integrates devices cannot be finished prior to integration because paint, chemical treatment, or similar finish may interfere with welding or similar process. Separation and easy disassembly simplifies manufacturing and assembly of the container handling device 10.

Separation of component also allows components simplifies shipping and handling, simplifying transportation. Shipping an integrated device requires a shipping method with a large cargo area. Individual pieces can be packed tighter and shipped with smaller area requirements. Also, handling an integrated device may require extra equipment when the integrated device is too large or unwieldy to be handled by hand.

Individual pieces are more easily carried by hand. Separation of component simplifies transportation.

Figure 8:
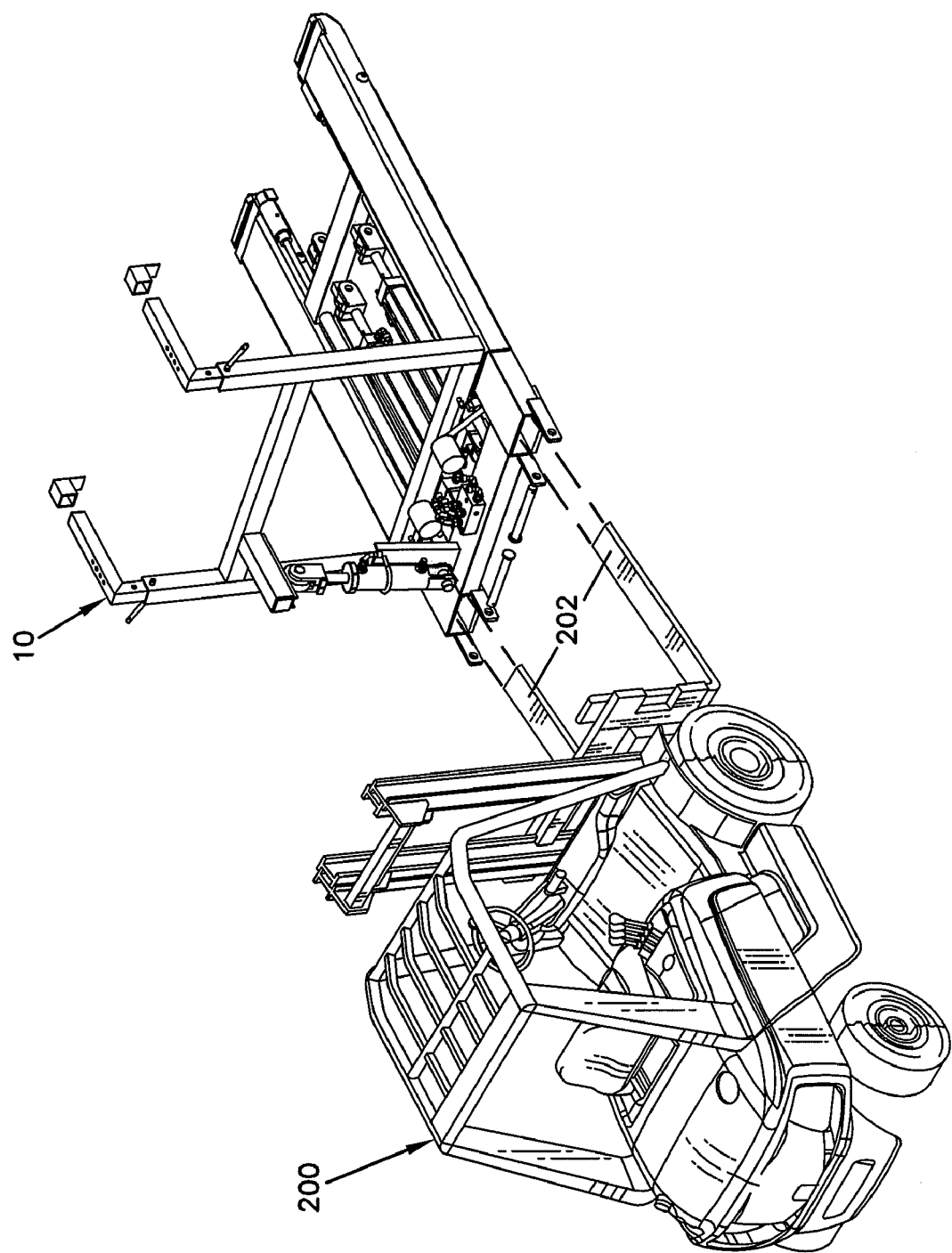
FIG. 8 is a perspective view of the attachment device shown in FIG. 1 in use with a front-end loader.

FIG. 8 illustrates an example front-end loader 200 for use with the container handling device 10. The loader 200 includes a pair of lift arms 202 that engage the device 10 and provide lifting of the device 10 vertically. Other types of loaders besides the front-end, fork-lift style loader 200 could be used with the container handling device 10 to provide the lifting and moving features desired to provide proper unloading of a container held by the device 10.

Additionally, separation allows components to be easily replaced, which simplifies maintenance. Repairing an integrated device may require the entire device to be replaced if a single component cannot be replaced. Even if a piece that is attached by welding or similar operation can be removed, the removal process can leave the device weakened at the point of removal. Less permanent forms of assembly allow a component to be removed and replaced without damaging the device. Separation simplifies maintenance The above specification, examples and data provide a complete description of the manufacture and use of the composition of the invention. Since many embodiments of the invention can be made without departing from the spirit and scope of the invention, the invention resides in the claims hereinafter appended.

I claim:

1. A container holding device for use with a front-end loader, the container holding device comprising:
a base frame including first and second rails, a cross-support coupled between the first ends of the first and second rails, the base frame configured for attachment to the front-end loader;
a container frame including first and second horizontal arms, first and second vertical arms, first and second top container retainers, and retaining arms, the top container retainers extending from the vertical arms in a direction generally parallel to the horizontal arms, the retaining arms extending from the top container retainers toward the horizontal arms into a container held by the container holding device, the horizontal arms pivotally coupled to the base frame at second ends of the first and second rails with first and second coupling members;
a first actuator coupled between the base frame and the container frame, the first actuator being configured to move the container frame relative to the base frame through a first angle;
a second actuator coupled between the base frame and the container frame and configured to move the container frame relative to the base frame through a second angle; and
first and second bottom container retainers adjustable between extended and retracted positions, wherein in the extended position the container retainers restrict movement of the container in a direction along the length of the first and second horizontal arms of the container frame, each container retainer including an elongate actuating arm and an engagement arm coupled to the actuating arm, the actuating arm being mounted to the container frame and configured to rotatably adjust the engagement arm into an engagement position to resist movement of the container relative to the horizontal arms in a direction parallel to the horizontal arms, wherein each container retainer further includes an offset counterweight on an end of the actuating arm opposite the engagement arm, wherein the counterweight provides automatic rotation of the actuating arm when the container frame rotates relative to the base frame, wherein each container retainer includes a spring for biasing the engagement arm toward the engagement position when the container frame is moved relative to the base frame through the second angle.

2. The holding device of claim 1, wherein the container frame further includes an actuator engagement member, the actuator engagement member having a track structure formed thereon, and the first actuator includes a roller positioned on a free end thereof, the roller being configured to fit within the track structure whereby extension of the actuator causes the roller to move in the track.

3. The holding device of claim 2, wherein the first and second actuators are hydraulic rams.

4. The holding device of claim 1, further comprising an actuator bracket coupled to the base frame and configured to support the first actuator in a generally vertically oriented position.

5. The holding device of claim 4, wherein the first actuator is oriented at an angle of about 5 to about 15 degrees from a direction perpendicular to the base frame.

6. The holding device of claim 1, wherein the first and second rails are hollow and configured for receiving lift arms of the front-end loader.

7. The holding device of claim 1, wherein the coupling members are removable bolts that provide detachment of the container frame from the base frame.

8. The holding device of claim 1, wherein the engagement arm is removably coupled to the actuating arm with a fastener.

9. The holding device of claim 1, wherein the top container retainers are adjustably mounted vertically relative to the vertical arms, and wherein the retaining arms are adjustably mounted horizontally relative to the top container retainers. removable bolts that provide detachment of the container frame from the base frame.

10. A lifting assembly, comprising:
a front-end loading vehicle;
a container; and
a container holding device, comprising:
a base frame including first and second rails, a cross-support coupled between first ends of the first and second rails, an actuator support extending in a generally normal direction from the cross-support, the base frame being configured for attachment to the front-end loader;
a container frame including first and second horizontal arms, first and second vertical arms extending from the horizontal arms, a top container retainer, a retaining arm, and an actuator engagement member, the actuator engagement member having a track structure formed thereon, the horizontal arms being pivotally coupled to the base frame at second ends of the first and second rails with first and second coupling members, and the top container retainer extends from one of the vertical arms in a direction parallel to the horizontal arms, the top container retainer being arranged to resist movement of the container in a direction perpendicular to the horizontal arms when the container is supported on the horizontal arms, the retaining arm being mounted to the top container retainer and having a portion thereof extending toward the horizontal arms and into the container, wherein the top container retainer is adjustable vertically relative to the one vertical arm the top container retainer extends from, wherein the retaining arm is adjustable horizontally relative to the top container retainer;
a first actuator coupled to and extending parallel with the actuator support, the first actuator having a roller positioned on a free end thereof, the roller being configured to fit within the track structure, wherein extension of the first actuator moves the container frame through a first angle of pivotal motion relative to the base frame;

a second actuator coupled between the base frame and the container frame and configured to move the container frame through a second angle of pivotal motion relative to the base frame; and a bottom container retainer including an elongate actuating arm and an engagement arm coupled to the actuating arm, the actuating arm being mounted to the container frame and configured to rotatably adjust the engagement arm into an engagement position to resist movement of the container relative to the horizontal arms in a direction parallel to the horizontal arms.

11. The lifting assembly of claim 10, wherein the engagement arm is removably coupled to the actuating arm with a fastener.

12. The lifting assembly of claim 10, wherein the first and second coupling members are removable bolts.

13. The lifting assembly of claim 10, further comprising at least two bottom container retainers configured for individual actuation.

14. The lifting assembly of claim 10, wherein the actuator support extends from the base frame at an angle of about 75 to about 90 degrees.

15. The lifting assembly of claim 10, wherein the first actuator is coupled to the actuator support with a load pin.

16. The lifting assembly of claim 10, wherein the bottom container retainer includes an offset counterweight on an end of the actuating arm opposite the engagement arm, wherein the counterweight provides automatic rotation of the actuating arm when the container frame rotates relative to the base frame, wherein the bottom container retainer includes a spring for biasing the engagement arm toward the engagement position when the container frame is moved relative to the base frame through the second angle.

17. The lifting assembly of claim 10, wherein two top container retainers are provided, one top container retainer extending from each of the first and second vertical arms, and wherein two retaining arms are provided, one retaining arm mounted to each of the top container retainers.

18. A container holding device for use with a front-end loader, the container holding device comprising:

a base frame including first and second rails, a cross-support coupled between the first ends of the first and second rails, the base frame configured for attachment to the front-end loader;

a container frame including first and second horizontal arms, first and second vertical arms, first and second top container retainers, the top container retainers extending from the vertical arms in a direction generally parallel to the horizontal arms, the horizontal arms pivotally coupled to the base frame at second ends of the first and second rails with first and second coupling members;

a first actuator coupled between the base frame and the container frame, the first actuator being configured to move the container frame relative to the base frame through a first angle;

a second actuator coupled between the base frame and the container frame and configured to move the container frame relative to the base frame through a second angle; and first and second bottom container retainers adjustable between extended and retracted positions, wherein in the extended position the container retainers restrict movement of the container in a direction along the length of the first and second horizontal arms of the container frame, each container retainer including an elongate actuating arm and an engagement arm coupled to the actuating arm, the actuating arm being mounted to the container frame and configured to rotatably adjust the engagement arm into an engagement position to resist movement of the container relative to the horizontal arms in a direction parallel to the horizontal arms, wherein each container retainer further includes an offset counterweight on an end of the actuating arm opposite the engagement arm, wherein the counterweight provides automatic rotation of the actuating arm when the container frame rotates relative to the base frame, wherein each container retainer includes a spring for biasing the engagement arm toward the engagement position when the container frame is moved relative to the base frame through the second angle.

19. The holding device of claim 18, wherein the container frame further includes an actuator engagement member, the actuator engagement member having a track structure formed thereon, and the first actuator includes a roller positioned on a free end thereof, the roller being configured to fit within the track structure whereby extension of the actuator causes the roller to move in the track.

20. The holding device of claim 19, wherein the first and second actuators are hydraulic rams.

21. The holding device of claim 18, further comprising an actuator bracket coupled to the base frame and configured to support the first actuator in a generally vertically oriented position.

22. The holding device of claim 21, wherein the first actuator is oriented at an angle of about 5 to about 15 degrees from a direction perpendicular to the base frame.

23. The holding device of claim 18, wherein the first and second rails are hollow and configured for receiving lift arms of the front-end loader.

24. The holding device of claim 22, wherein the coupling members are removable bolts that provide detachment of the container frame from the base frame.

25. A method of unloading a container using a container holding device that is attached to a front-end loader, the holding device comprising a base frame, a container frame, first and second actuators, at least one bottom container retainer, at least one top container retainer, and a retaining arm mounted to the at least one top container retainer, the base frame including first and second rails configured for attachment to the front-end loader, the container frame including first and second horizontal arms and at least one vertical arm, the first and second horizontal arms being pivotally connected to distal ends of the first and second rails, respectively, the method comprising:

supporting the container on the first and second horizontal arms;

adjusting a vertical position of the at least one top container retainer so as to be adjacent to a top rear edge of the container, wherein the at least one top container retainer faces a top surface of the top rear edge of the container;

adjusting a horizontal position of the retaining arm relative to the at least one top container retainer, wherein the retaining arm faces an inside surface of the top rear edge of the container;

actuating the first actuator to initiate rotation of the container frame relative to the base frame where the top rear edge of the container rotates away from the front-end loader;

rotating the bottom container retainer with a counterweight into a raised position to engage a bottom front edge of the container as the container frame begins to rotate;

actuating the second actuator after actuating the first actuator to further rotate the container frame relative to the base frame until contents of the container unload from the container by gravity forces.

26. The method of claim 25, wherein the first actuator is positioned between the base frame and the container frame, and the first actuator includes a roller mounted to an end thereof, the method further comprising engaging the container frame with the roller when the first actuator is activated.

27. The method of claim 25, wherein the at least one bottom container retainer includes an elongate actuating arm and an engagement arm coupled to the actuating arm, the method further comprising rotating the actuating arm to rotate the engagement arm between a first position engaging the container and a second position removed from engagement with the container, wherein the method further comprises biasing the counterweight with a spring so that the engagement arm remains in the first position while the container frame is rotated to unload the contents of the container.

28. The method of claim 25, wherein the step of adjusting the horizontal position of the retaining arm occurs before the step of adjusting the vertical position of the at least one top container retainer.

29. The method of claim 25, wherein the step of adjusting the horizontal position of the retaining arm occurs after the step of adjusting the vertical position of the at least one top container retainer.

* * * * *

UNITED STATES PATENT AND TRADEMARK OFFICE
CERTIFICATE OF CORRECTION

| | |
|---|---|
| PATENT NO. | : 7,597,526 B2 |
| APPLICATION NO. | : 11/222559 |
| DATED | : October 6, 2009 |
| INVENTOR(S) | : Benson |

It is certified that error appears in the above-identified patent and that said Letters Patent is hereby corrected as shown below:

Col. 12, lines 33-34, claim 9: delete "removable bolts that provide detachment of the container frame from the base frame."

Signed and Sealed this

Ninth Day of November, 2010

David J. Kappos
*Director of the United States Patent and Trademark Office*

UNITED STATES PATENT AND TRADEMARK OFFICE
CERTIFICATE OF CORRECTION

PATENT NO.         : 7,597,526 B2
APPLICATION NO.    : 11/222559
DATED              : October 6, 2009
INVENTOR(S)        : Benson It is certified that error appears in the above-identified patent and that said Letters Patent is hereby corrected as shown below:

Col. 15, line 11, claim 27: "elongate actuating ann" should read --elongate actuating arm--

Signed and Sealed this
Twenty-first Day of February, 2012

David J. Kappos
*Director of the United States Patent and Trademark Office*